Dec. 15, 1925.

H. H. SANDMAN

COLTER ATTACHMENT

Filed May 28, 1924

1,565,676

Inventor
Harry H. Sandman.

By

Attorney

Patented Dec. 15, 1925.

1,565,676

UNITED STATES PATENT OFFICE.

HARRY H. SANDMAN, OF HAVANA, ILLINOIS.

COLTER ATTACHMENT.

Application filed May 28, 1924. Serial No. 716,394.

*To all whom it may concern:*

Be it known that I, HARRY H. SANDMAN, a citizen of the United States, residing at Havana, in the county of Mason, State of Illinois, have invented certain new and useful Improvements in Colter Attachments; and I do hereby declare the following to be a full, clear, and exact description of the invention, such as will enable others skilled in the art to which it appertains to make and use the same.

This invention relates to plows and particularly to attachments therefor.

One object of the invention is to provide an attachment for a plow which is adapted to deflect the weeds and trash downwardly beneath the colter wheel, so that such weeds and trash will not become clogged in the colter.

Another object is to provide such an attachment which is secured to the stem or standard of the colter, and which has means for engagement with the colter wheel fork to prevent sidewise swinging movement of the colter when the plow is lifted from the ground.

Other objects and advantages will be apparent from the following description when taken in connection with the accompanying drawing.

Figure 1:
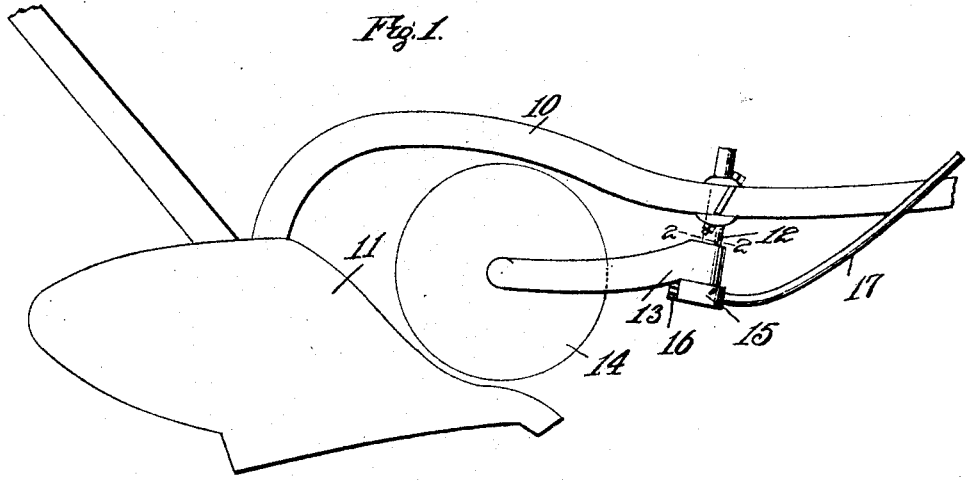
Figure 1 is a side elevation of a portion of a plow with the invention attached to the colter pintle.
Figure 2:
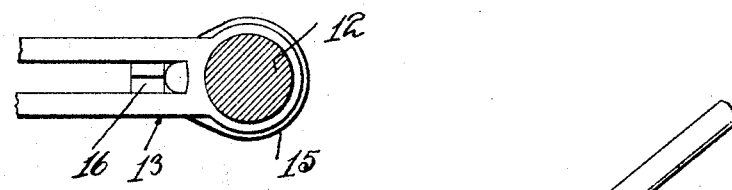
Figure 2 is a horizontal sectional view on the line 2—2 of Figure 1.
Figure 3:
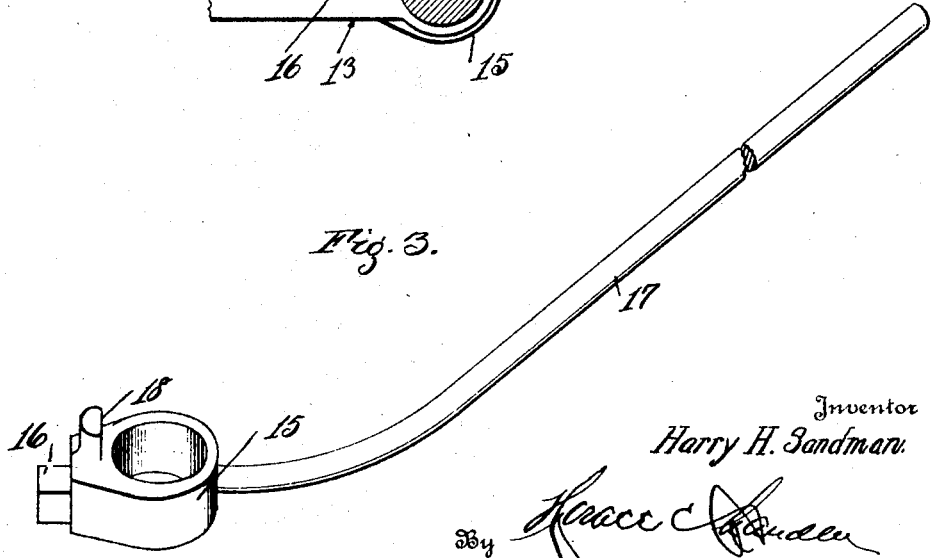
Figure 3 is a perspective view of the attachment removed from the plow.

Referring particularly to the accompanying drawing, 10 represents the beam of a plow, to which is connected the plow 11. Suitably clamped to the beam 10, and depending therebelow in front of the plow 11, is a stem or pintle 12, and rotatably supported on the lower end of this pintle is the fork 13, which supports the colter disk 14. Encircling the lower end of the stem 12, below the fork 13, is a collar or ring 15, the same being held in proper position by a set screw 16. This collar 15, when properly secured to the stem 12, serves to prevent disengagement of the fork from the stem. Formed on the forward side of the collar 15, and extending curvingly forward and upward in the direction of the beam 10, is an arm 17, which engages on the weeds, in advance of the colter, and presses them down so that they will be brought directly under the colter wheel, to be cut thereby. Furthermore, this arm serves to prevent the weeds becoming entangled in the shaft of the colter wheel, and the other parts of the device.

Formed on the upper face of the collar 15, and extending upwardly between the inner ends of the arms of the fork 13, is a pin 18, which limits the sidewise swinging movement of the fork, on the stem 12, whereby, when the plow is lifted from the ground, the colter will remain in proper position for immediate action on the ground when the plow is again placed in the ground.

Particular attention is called to the fact that the arm 17 does not swing sidewise, when the colter is lifted from the ground, because of the fact that the collar, which is formed integrally with the arm, is secured to the stem 12, which stem is fixed against rotation, by the clamp which holds same to the plow beam. Thus the attachment serves the double purpose of holding the fork of the colter from dropping from the stem, and of preventing lateral swinging of the colter fork.

What is claimed is:

A weed deflector for use in connection with the stem and fork of a plow colter comprising an upwardly curved deflector arm having a collar on one end thereof, means for adjustably securing said collar to said stem and a lug extending from one end of the collar in parallel relation to the axis of the collar at a point diametrically opposite to said arm and arranged to lie within the bifurcation of said fork, whereby to limit the side swing of said colter fork.

In testimony whereof, I affix my signature.

HARRY H. SANDMAN.